(12) United States Patent
Muhlhoff et al.

(10) Patent No.: US 12,076,954 B2
(45) Date of Patent: Sep. 3, 2024

(54) METHOD FOR MARKING A TIRE, IN PARTICULAR BY COLOR PRINTING

(71) Applicant: COMPAGNIE GENERALE DES ETABLISSEMENTS MICHELIN, Clermont-Ferrand (FR)

(72) Inventors: Olivier Muhlhoff, Clermont-Ferrand (FR); Walid Djabour, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 646 days.

(21) Appl. No.: 17/279,088

(22) PCT Filed: Sep. 24, 2019

(86) PCT No.: PCT/FR2019/052229
§ 371 (c)(1),
(2) Date: Mar. 23, 2021

(87) PCT Pub. No.: WO2020/065196
PCT Pub. Date: Apr. 2, 2020

(65) Prior Publication Data
US 2022/0048266 A1    Feb. 17, 2022

(30) Foreign Application Priority Data

Sep. 24, 2018   (FR) ........................................ 1858658

(51) Int. Cl.
*B29D 30/72*     (2006.01)
*B41J 3/407*     (2006.01)
*B60C 13/00*     (2006.01)

(52) U.S. Cl.
CPC ............ *B29D 30/72* (2013.01); *B41J 3/4073* (2013.01); *B60C 13/001* (2013.01); *B29D 2030/728* (2013.01)

(58) Field of Classification Search
CPC ........ B29D 2030/728; B29D 2030/726; B29D 30/72; B60C 13/001
See application file for complete search history.

(56) References Cited

U.S. PATENT DOCUMENTS

| 5,015,505 A | 5/1991 | Cetnar | |
|---|---|---|---|
| 2014/0022302 A1* | 1/2014 | Ogawa | B41J 3/4073 347/37 |
| 2015/0165830 A1* | 6/2015 | Hajikano | B60C 13/001 347/20 |

FOREIGN PATENT DOCUMENTS

EP      2 639 053      9/2013

* cited by examiner

Primary Examiner — John J DeRusso
(74) Attorney, Agent, or Firm — Cozen O'Connor

(57) ABSTRACT

A method for marking a tire having a tread and two sidewalls delimiting the tread, by inflating the tire mounted on a rim, and when in the inflated state, making, on at least one of the sidewalls, at least one marking which is at least partially colored, wherein during the inflation, the tire is inflated to a pressure greater than the nominal inflation pressure of the tire.

11 Claims, 2 Drawing Sheets

METHOD FOR MARKING A TIRE, IN PARTICULAR BY COLOR PRINTING

RELATED APPLICATIONS

This is a U.S. National Phase Application under 35 USC 371 of International Application PCT/FR2019/052229 filed on Sep. 24, 2019.

This application claims the priority of French application no. 18/58658 filed Sep. 24, 2018, the entire content of which is hereby incorporated by reference.

FIELD OF THE INVENTION

The present invention relates to the field of tires for vehicles.

More particularly, the invention relates to a method for marking a tire, in particular by color printing.

BACKGROUND OF THE INVENTION

A tire has a large number of markings that are intended to provide technical or legal information or to allow consumers to discern the brand of the product, or to provide information for identifying stock, an individual serial number, etc.

Furthermore, the markings can also be used to give the tire an original appearance, or to conceal local deformations that are generated during the manufacture of the tire and that may be visible at the sidewalls, in particular under certain lighting conditions.

Such markings may example be colored and affixed to the sidewall of the tire. It is possible for example to obtain such colored markings by inkjet printing or by depositing a coat of paint after the tire has been vulcanized. For more detail, reference may be made for example to the U.S. Pat. No. 5,015,505, which deals with such deposition of a coat of paint on the sidewall of the tire. It is also possible to make colored markings by the transfer of a colored film.

However, with such color marking, a problem of crack resistance generally arises. Surface cracks may for example be observed on the markings of tires delivered to consumers. Furthermore, during the use of the tires, such surface cracks may also arise and spread rapidly for example in the event of impacts or rubbing against kerbs, or during ageing.

SUMMARY OF THE INVENTION

The present invention aims to remedy these drawbacks.

The invention relates to a method for marking a tire of the type comprising a tread and two sidewalls delimiting said tread.

The method comprises a step of inflating the tire mounted on a rim, and a step of making, on at least one of the sidewalls of the tire, at least one marking which is at least partially colored on said sidewall in said inflated state of said tire.

According to one general feature of the invention, during the inflation step, the tire is inflated to a pressure greater than the nominal inflation pressure of said tire.

A "tire" means all types of resilient tread.

A "rubbery material" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

The "tread" of a tire means a quantity of rubbery material delimited by lateral surfaces and by two main surfaces, one of which, referred to as the tread surface, is intended to come into contact with a road surface when the tire is being driven on. The tread comprises a plurality of cuts extending over at least one of the lateral surfaces.

The "sidewall" of a tire means a part of the lateral surface of the tire that is disposed between the tread of the tire and a bead of this tire, starting from the ends of the cuts in the tread and extending as far as the bead.

An "at least partially colored marking" means any at least partially colored element or coating that is provided on the sidewall of the tire. The term "colored" is understood here as excluding the color black, i.e. all colors, including white. In other words, the marking has at least one color that is different from the generally black color of the rubbery material of the tire.

The inflation step and the step of making the marking are carried out after the tire has been vulcanized.

The "nominal inflation pressure" of a tire means the inflation pressure recommended by the manufacturer of the vehicle intended to be equipped with the tire for the normal use thereof, this pressure possibly differing between the front axle and the rear axle of one and the same vehicle.

Making the marking when the tire has been subjected to an internal pressure greater than the nominal inflation pressure has the advantage of slightly compressing the marking when this internal pressure is subsequently reduced, for example before the tire is delivered to the consumer, in order to be adjusted to the nominal inflation pressure.

By contrast, with a method in which the marking is made on a sidewall in the non-inflated state of the tire or in the state inflated to an internal pressure lower than the nominal inflation pressure, the marking thus obtained will be stretched when the internal pressure of the tire is subsequently increased to the nominal inflation pressure.

With the marking method according to the invention, the marking made is thus compressed when the internal pressure of the tire is returned to the nominal inflation pressure thereof, thereby substantially reducing the risk of the marking cracking before delivery to the consumer compared with a marking that is stretched at this nominal inflation pressure. Furthermore, during the use of the tire, with a marking compressed in this way, the speed at which surface cracks appear on said marking and the speed at which these cracks spread are also reduced.

By way of indication, during the inflation step, the tire may be inflated to a pressure of between 105% and 300% of the nominal inflation pressure of said tire, and preferably to a pressure of between 120% and 180% of the nominal inflation pressure of said tire.

In one particularly advantageous implementation, the step of inflating the tire is carried out on the final rim of the tire.

The "final rim" means the rim of the tire that is intended to be mounted on the vehicle without any operation of removing the tire between marking and this mounting on the vehicle.

One advantage of marking the tire already mounted on its final rim is that deformations of the sidewall bearing the marking, and thus deformations of this marking, are limited given that the tire does not need to be removed from its rim at the end of the marking process.

In an alternative implementation, it remains possible, however, to mount the tire on what is known as an industrial rim, i.e. a rim that is used only during the marking process on the associated marking machine, and to make the marking when the tire is mounted on this rim. Such an industrial rim can be made in one or more parts. For example, the industrial machines intended to take cured tires for an operation may be made up of two half-rims that are movable axially with respect to one another and make it possible to mount and remove the tire extremely quickly. For inflation, air is injected between the two half-rims.

The step of inflating the tire can therefore be carried out on a rim made up of two half-rims.

However, another advantage of marking the tire mounted on its final rim is that the marking is allowed to dry and harden with a constant internal pressure inside the tire without it being absolutely necessary to carry out this phase of drying and hardening on the marking machine.

This therefore makes it possible to save the time required for carrying out the drying and hardening of the marking directly on the machine. Indeed, a complete phase of drying and hardening of the marking may last between a few minutes and several hours depending on the nature of the products used for the marking.

Furthermore, in the phases that follow the marking of the tire, for example as it is conveyed towards the vehicle assembly line, the internal inflation pressure to which the tire mounted on its final rim is subjected makes it possible to keep the sidewall supporting the marking in position with very little deformation, even when the tire is handled.

Preferably, the marking is made with the aid of at least one marking product application head.

In one particular implementation, the marking may be made by color printing on said sidewall. In this case, the application head(s) are print heads, in particular inkjet color print heads. In a variant, the marking may be made by depositing one or more coats of paint and/or varnish Alternatively, the marking may also be made by the cold or hot transfer of a colored film.

The tire may be driven in rotation during the step of making said marking. Alternatively or in combination, said head may be driven in rotation during the step of making said marking. Preferably, said head and/or the tire are driven in rotation at a constant speed during this step.

In one particularly advantageous implementation, only the tire is driven in rotation during the step of making said marking.

This makes it possible to ensure coaxiality between the marking and the rim flange of the rim that is present at the ring of the rim. This is particularly advantageous when the marking is present in the form of an annular surface, in particular when this surface is situated in the lower sidewall region of the tire. A marking in the lower sidewall region of the tire aims to visually increase the wheel diameter and gives the illusion that the tire is of the low-profile type. A "low-profile tire" means a tire of which the sidewall height is fairly low compared with the width of the tread.

Advantageously, the tire can be driven in rotation via the bore in the hub of the rim during the step of making said marking. This further promotes the achievement of good coaxiality between the marking and the rim flange.

The tire may be in a horizontal position, or in a vertical position, during the step of making said marking.

The method may also comprise a step of specifically deflating the tire to the nominal inflation pressure after the step of making the marking.

In one particular implementation, the method comprises a step of drying and hardening said marking made on said sidewall of the tire with the aid of a device for drying and hardening. This device may be for example an ultraviolet lamp or an infrared lamp, or a means for blowing hot air.

The drying and hardening step may be carried out so as to obtain partial or complete drying and hardening of the marking on the associated marking machine.

As indicated above, when the tire is mounted on its final rim, the phase of drying and hardening the marking may be carried out only partially on the associated marking machine, or be carried out entirely away from the marking machine.

If the method comprises a step of specifically deflating the tire to the nominal inflation pressure, this deflation step may be carried out after the end of the phase of drying and hardening said marking.

The method may also comprise a step of mounting the tire on the rim. It is also possible to carry out the inflation step and the step of making the marking on a tire that is already in the state mounted on a rim.

In one particular implementation, said marking is made on a surface of said sidewall that has a surface roughness of parameter $R_a$ less than or equal to 30 µm.

Thus, this surface of the sidewall to be colored is generally smooth. This makes it easier to obtain a good-quality marking. To this end, the surface roughness of parameter $R_a$ is preferably less than or equal to 15 µm, and in particular less than or equal to 5 µm, and greater than or equal to 3 µm.

In one particular implementation, the surface-area of said marking that is made may be at least equal to 6 cm$^2$. Said marking may comprise a single at least partially colored zone or be made up of a plurality of at least partially colored zones that are spaced apart from one another. In an embodiment variant, said marking forms overall an annular surface on said sidewall of the tire. So as to be particularly visible, said marking may be situated substantially at the equator of the sidewall of the tire, that is to say at the point where it is widest.

Said marking may comprise letters, and/or symbols, and/or numbers for indicating technical information of the tire. Said marking may also comprise legal or distinctive information about the brand of the tire or barcodes for identifying stock, an individual serial number of said tire, etc.

In order to limit the manufacturing costs of the tire, said marking is preferably made only on the outer sidewall of the tire, that is to say the sidewall intended to be positioned on the outer side of the vehicle.

In one particular implementation, said marking may be made on the lateral surface of said sidewall of the tire. Alternatively, said marking may be made on the inside of a recessed housing formed in this lateral surface of said sidewall.

BRIEF DESCRIPTION OF THE DRAWINGS

The present invention will be understood better from reading the detailed description of an embodiment considered by way of entirely non-limiting example and illustrated by the appended figures, in which.

DETAILED DESCRIPTION OF THE PRESENTLY PREFERRED EMBODIMENTS

Figure 1:
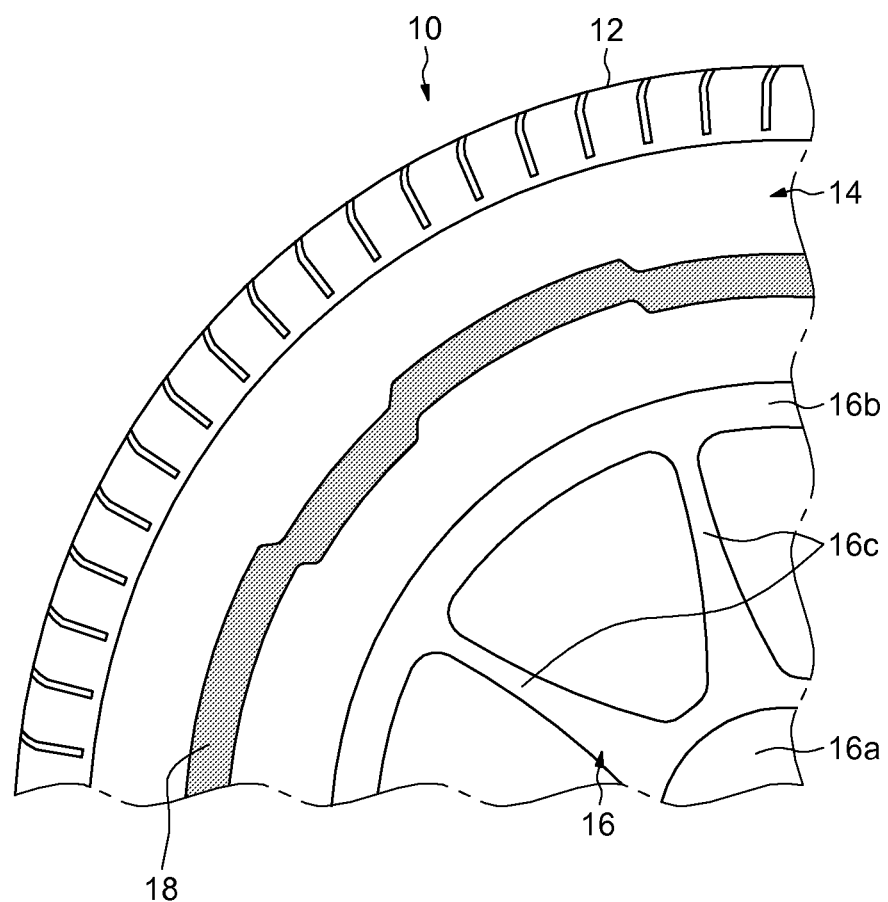
FIG. 1 is a partial side view of a tire that comprises a marking made on a sidewall of the tire according to one exemplary embodiment of the invention.

FIG. 1 schematically shows a tire 10 comprising a tread 12 and lateral sidewalls 14 surrounding the tread on either side, only one being visible in the figure. The tread 12 comprises a tread surface intended to come into contact with a road surface during running. The tire 10 is mounted on a rim 16, which is preferably the final or definitive rim intended to be mounted on the vehicle. The rim 16 comprises a hub 16a, an outer ring 16b and a plurality of spokes 16c connecting the hub to the ring.

The sidewall 14 comprises a colored marking 18. In FIG. 1, the marking 18 has been shown in grey. In the exemplary embodiment illustrated, the marking 18 forms, on the sidewall 14 of the tire, an overall annular surface in the form of a continuous ring centred on the axis of rotation of the tire. Alternatively, it is possible to provide other shapes and/or other dispositions with respect to the axis of rotation of the tire. The marking 18 may for example be discontinuous in the circumferential direction. In this case, the marking 18 may be made up of a plurality of colored zones that are spaced apart from one another on the sidewall in the circumferential direction and/or in the radial direction. The colored zones may have identical external shapes or different shapes. The colored zones may for example have square, hexagonal, rectangular or parallelogram shapes.

The marking 18 may advantageously be made on the sidewall 14 after the tire has been vulcanized, by color printing with the aid of one or more print heads, as will be described in more detail below. In a variant, it is possible to make the colored marking 18 in some other way, for example by depositing paint or varnish, or by cold or hot transfer.

The marking 18 has at least one color that is different from the generally black color of the rubbery material of the tire. The marking 18 may have several colors.

As indicated above, in order to make the marking 18, it is possible to provide inkjet color printing on the sidewall 14 of the tire. In this case, use may be made of a marking machine (not shown) comprising inkjet print heads, a support means for the tire and a means for driving said support means in rotation. The support means may be provided to allow the tire to be held in a vertical position or in a horizontal position during the printing step.

The marking machine also comprises a control unit for controlling the operation of the print heads, which may for example be in the form of a printed circuit board. The marking machine also comprises a device for drying and hardening the coat(s) of ink deposited on the sidewall, for example an ultraviolet lamp or infrared lamp, or a means for blowing hot air. For more details relating to this type of marking machine, reference may be made for example to the patent EP-B1-2 639 053.

Figure 2:
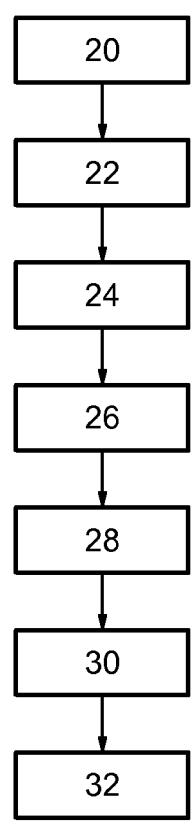
FIG. 2 is a flow chart of a method for marking the tire according to one exemplary implementation of the invention.

The marking of the sidewall 14 of the tire may be obtained using the marking method in FIG. 2.

In a first step, referenced 20, the tire equipped with its rim is inflated to an inflation pressure greater than the nominal inflation pressure recommended for said tire. The tire is for example inflated to a pressure of between 105% and 300% of the nominal inflation pressure of said tire. Preferably, the inflation pressure is between 120% and 180% of the nominal inflation pressure of the tire.

Next, in a second step, referenced 22, the inflated tire equipped with its rim is mounted on the marking machine. During this step, the print heads and the drying and hardening device are moved to face the sidewall to be marked.

Next, during a third step, referenced 24, the tire is driven in rotation at a constant speed via the drive means of the marking machine.

In a fourth step, referenced 26, the print heads are positioned relative to the sidewall of the tire in a determined position. This step of positioning the print heads is controlled by the control unit.

In order to position the print heads, it is for example possible to determine the position of a reference mark provided on the sidewall of the tire. By way of indication, this reference mark may for example be provided in a protruding or recessed manner on the sidewall of the tire and be in the form of a texture that is integral with said sidewall and contrasts therewith. In this case, the marking machine comprises a system for measuring the lightness, for example a spectrocolorimeter, for determining the position of this reference mark on the sidewall of the tire depending on lightness measurements that are taken on the sidewall. To this end, the lightness measurements are transmitted by the measurement system to the control unit, which comprises all the hardware and software for determining the position of the reference mark on the sidewall on the basis of these measurements. The control unit steers the positioning of the print heads relative to the sidewall of the tire.

Then, in a fifth step, referenced 28, the color printing by the print heads is commanded in order to obtain the predetermined marking on the sidewall of the tire. The step of making the marking is therefore carried out in the inflated state of the tire at the inflation pressure value applied in step 20, which is greater than the nominal inflation pressure value of said tire.

Next, in a sixth step, referenced 30, the starting of the drying and hardening device is commanded in order to obtain the drying and the hardening of the ink deposited on the sidewall. The steering of the print heads and the operation of the drying and hardening device are controlled by the control unit. During the fifth and sixth steps, the tire is still being driven in rotation at a constant speed.

Finally, in a seventh step, referenced 32, the rotation of the tire is stopped and the tire equipped with its rim is removed from the marking machine.

After removal from the marking machine and after completion of the phase of drying and hardening of the marking, it may be possible to deflate the tire so as to return it to the nominal inflation pressure.

In the above-described marking method, the marking is made on the tire by color printing. As indicated above, it remains possible to provide other ways of obtaining the marking on the sidewall of the tire.

By virtue of the method according to the invention, in which the marking(s) is/are made in the inflated state of the tire at an inflation pressure greater than the nominal inflation pressure thereof, the quality of the marking(s) upon delivery of the tire to the consumer is improved and the appearance of surface cracks on these markings during the use thereof is reduced.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for marking a tire of the type comprising a tread and two sidewalls delimiting said tread, the method comprising:
    inflating the tire mounted on a rim, and
    in the inflated state of the tire, making, on at least one of the sidewalls of said tire, at least one marking which is at least partially colored, wherein during the inflation, the tire is inflated to a pressure greater than the nominal inflation pressure of said tire.

2. The method according to claim 1, wherein the tire is inflated to a pressure of between 105% and 300% of the nominal inflation pressure of said tire.

3. The method according to claim 1, wherein the tire is inflated to a pressure of between 120% and 180% of the nominal inflation pressure of said tire.

4. The method according to claim 1, wherein the rim onto which is mounted the tire during the inflating step is the final rim of the tire.

5. The method according to claim 1, wherein the rim onto which is mounted the tire during the inflating step is made up of two half-rims.

6. The method according to claim 1, wherein said at least one marking is made by color printing with the aid of at least one print head.

7. The method according to claim 6, wherein said at least one marking is made by inkjet color printing.

8. The method according to claim 7, wherein the tire is driven in rotation at a constant speed.

9. The method according to claim 1, wherein the tire is driven in rotation during the making of said at least one marking via a bore in a hub of the rim.

10. The method according to claim 1, wherein the tire is in a horizontal position or in a vertical position during the making of said at least one marking.

11. The method according to claim 1, further comprising deflating the tire to the nominal inflation pressure after the making of said at least one marking.

* * * * *